(12) United States Patent
Akagi et al.

(10) Patent No.: US 10,921,800 B2
(45) Date of Patent: Feb. 16, 2021

(54) MOTOR CONTROL DEVICE

(71) Applicant: OMRON Corporation, Kyoto (JP)

(72) Inventors: Tetsuya Akagi, Kyoto (JP); Minoru Hashimoto, Ritto (JP); Ryuichi Jimbo, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/478,141

(22) PCT Filed: Feb. 21, 2018

(86) PCT No.: PCT/JP2018/006291
§ 371 (c)(1),
(2) Date: Jul. 16, 2019

(87) PCT Pub. No.: WO2018/155511
PCT Pub. Date: Aug. 30, 2018

(65) Prior Publication Data
US 2019/0369612 A1    Dec. 5, 2019

(30) Foreign Application Priority Data

Feb. 21, 2017 (JP) ................................ 2017-030075

(51) Int. Cl.
*G05B 23/02* (2006.01)
*G05B 9/02* (2006.01)
(Continued)

(52) U.S. Cl.
CPC ......... *G05B 23/0286* (2013.01); *G01D 5/245* (2013.01); *G05B 9/02* (2013.01);
(Continued)

(58) Field of Classification Search
CPC .... H02P 3/18; G05B 9/02; G05B 9/00; G05B 23/0286; G05B 19/048; G01D 5/245
See application file for complete search history.

(56) References Cited

U.S. PATENT DOCUMENTS 8,659,254 B2 * 2/2014 Ueno ..................... G05B 19/18
318/565
9,457,305 B2 * 10/2016 Collet ................ B01D 46/0002
(Continued)

FOREIGN PATENT DOCUMENTS

EP    2639661    9/2013
EP    3023846    5/2016
(Continued)

OTHER PUBLICATIONS

"International Search Report (Form PCT/ISA/210)" of PCT/JP2018/006291, dated May 22, 2018, with English translation thereof, pp. 1-2.

(Continued)

*Primary Examiner* — Bickey Dhakal
(74) *Attorney, Agent, or Firm* — JCIPRNET

(57) ABSTRACT

A motor control device comprising a motor control unit that, on the basis of an operation command signal for driving a motor and a feedback signal, from an encoder, corresponding to the operation of the motor, generates a command value pertaining to the operation of the motor in accordance with a prescribed feedback scheme so that the operation of the motor follows the operation command signal, wherein interrupt processing of a drive signal is executed by an interrupt unit on the basis of a comparison result of two items pertaining to a prescribed feedback value calculated using the feedback signal from the encoder, and to a state calculation value that is calculated on the basis of the operation command signal and that pertains to an operating state of the motor comparable with the prescribed feedback value.

8 Claims, 7 Drawing Sheets

(51) Int. Cl.
  *G05B 19/25* (2006.01)
  *H02P 3/18* (2006.01)
  *G01D 5/245* (2006.01)
  *G05B 19/048* (2006.01)
(52) U.S. Cl.
  CPC ......... *G05B 19/048* (2013.01); *G05B 19/25* (2013.01); *H02P 3/18* (2013.01)

(56) References Cited

U.S. PATENT DOCUMENTS

| | | | | |
|---|---|---|---|---|
| 2010/0164423 | A1* | 7/2010 | Nakayama | G05B 19/0425 318/565 |
| 2010/0327667 | A1* | 12/2010 | Fujita | G05B 9/02 307/326 |
| 2011/0241447 | A1* | 10/2011 | Ando | G05B 19/4063 307/326 |
| 2017/0254325 | A1* | 9/2017 | Tajima | G05B 9/02 |

FOREIGN PATENT DOCUMENTS

| | | |
|---|---|---|
| JP | 4261320 | 4/2009 |
| JP | 2011008642 | 1/2011 |
| JP | 5376623 | 12/2013 |
| JP | 2016208656 | 12/2016 |
| JP | 2016208656 A * | 12/2016 |

OTHER PUBLICATIONS

"Written Opinion of the International Searching Authority (Form PCT/ISA/237)" of PCT/JP2018/006291, dated May 22, 2018, with English translation thereof, pp. 1-10.

"Search Report of Europe Counterpart Application", dated Nov. 16, 2020, p. 1-p. 10.

* cited by examiner

MOTOR CONTROL DEVICE

CROSS-REFERENCE TO RELATED APPLICATION

This application is a 371 application of the International PCT application serial no. PCT/JP2018/006291, filed on Feb. 21, 2018, which claims the priority benefits of Japan Patent Application no. JP2017-030075, filed on Feb. 21, 2017. The entirety of each of the above-mentioned patent applications is hereby incorporated by reference herein and made a part of this specification.

TECHNICAL FIELD

The present invention relates to a motor control device that drives and controls a motor.

BACKGROUND ART

In recent years, a servo system has been used for, for example, positioning control of operating units in various machines at manufacturing sites. An example of such a servo system includes a system including a servo motor for operating various mechanical devices, an encoder attached to the servo motor, a servo driver for driving the servo motor, and a control device for outputting a position command information or the like to the servo driver. Efforts to ensure the safety of workers together with cost reduction and improvement in productivity are becoming important requirements at the manufacturing sites. Therefore, a servo system is also required to be suitable for corresponding safety standards.

Here, Patent Literature 1 discloses a safety unit that outputs a stop signal for stopping a servo motor to a servo driver when a failure occurs. Specifically, the safety unit is configured to output the stop signal when a determination is made that any one of a value of an operation command signal from a control device to the servo motor, a value of a feedback signal from an encoder, and a determination value calculated from both of the values fails. With such a configuration, it is possible to achieve safety of a servo system. Further, Patent Literature 2 discloses a system configuration that outputs an alarm in a case in which position information from an encoder in a system has shifted between before and after the power of a servo system is switched ON when the power of the servo system is switched from OFF to ON for replacement of a command unit including the encoder. With this configuration, appropriate replacement work for the command unit is secured.

CITATION LIST

Patent Literature

[Patent Literature 1] Japanese Patent No. 5376623
[Patent Literature 2] Japanese Patent No. 4261320

SUMMARY

Technical Problem

In the related art, in a motor control device that drives and controls a motor, it has been considered that it is necessary to enhance the safety performance of an encoder that detects a movement of the motor that generates input information for the motor control device in order to enhance the safety performance of the motor control device. Therefore, it is necessary for requirements of predetermined safety standards to be satisfied in design of an encoder. For example, IEC 61508 is defined as such a safety standard. IEC 61508 is an international standard for functional safety of electrical, electronic and programmable electronic safety-related systems. In IEC 61508, a probability of failure of a system is defined by a measure called Safety Integrity Level (SIL) as shown in Table 1 below.

TABLE 1

| Safe Failure | Hardware Fault Tolerance (HFT) | | |
|---|---|---|---|
| Fraction (SFF) | 0 | 1 | 2 |
| <60% | Not allowed | SIL1 | SIL2 |
| 60%-<90% | SIL1 | SIL2 | SIL3 |
| 90%-<99% | SIL2 | SIL3 | SIL4 |
| ≥99% | SIL3 | SIL4 | SIL4 |

The IEC 61508 defines requirements to be satisfied for each SIL in the table, and initiatives to be achieved by a safety control system to be constructed are clarified. The SILs are divided into the four stages SIL1 to SIL4, and a greater value of SIL indicates a higher safety performance. It is inevitably necessary for an SIL of an encoder to be adopted to be increased in order to increase the value of the SIL regarding the motor control device. This leads to an increase in costs for the encoder or an increase in a size of the encoder due to, for example, the necessity of adopting a special interface, and impairs convenience in design of the motor control device.

The present invention has been made in view of such problems, and an object of the present invention is to provide a technology for enhancing the safety performance of a motor control device regardless of the safety performance of an encoder.

Solution to Problem

In the present invention, in order to solve the above problems, a state calculation value having a correlation with an operation state of the motor calculated by a motor control device itself, in addition to a feedback value calculated by a feedback signal from an encoder corresponding to a motor, is also adopted as input information for securing safety performance of the motor control device. With such a configuration, it is possible to enhance safety performance of the motor control device regardless of safety performance of the encoder.

Specifically, the present invention is a motor control device for driving a motor having an encoder that detects an operation of the motor, and includes a motor control unit that generates a command value regarding the operation of the motor according to a predetermined feedback scheme so that the operation of the motor follows an operation command signal for driving the motor on the basis of the operation command signal and a feedback signal from the encoder corresponding to the operation of the motor; a drive unit that supplies a drive current for driving the motor to the motor according to the command value from the motor control unit; an interrupt unit that interrupts transfer of a drive signal from the motor control unit to the drive unit according to the command value; and a safety control unit that executes an interrupting process of the drive signal via the interrupt unit when a determination is made that a failure has occurred in driving of the motor. The safety control unit executes the interrupting process of the drive signal in the interrupt unit on the basis of a result of comparing a predetermined feedback value that is calculated by the feedback signal from the encoder with a state calculation value regarding an operation state of the motor that is calculated on the basis of the operation command value and is comparable with the predetermined feedback value.

The motor control device according to the present invention is a device that drives the motor on the basis of the operation command signal, and a servo driver, an inverter, or the like can be illustrated as the motor control device. It should be noted that the operation command signal may be generated by another control device (a PLC or the like) located outside the motor control device and provided to the motor control device, or may be generated inside the motor control device. Specifically, the motor control unit generates a command value for driving the motor according to a predetermined feedback scheme from the operation command signal and the feedback signal from the encoder. By transferring a drive signal with the command value from the motor control unit to the drive unit, the drive unit supplies a drive current according to the command value to the motor, and the motor is driven to follow the operation command signal. It should be noted that, for the predetermined feedback scheme, any feedback scheme can be adopted as long as the motor can be driven to follow the operation command signal. For example, a feedback scheme regarding position information, speed information, or the like can be adopted.

Here, the motor control device includes the interrupt unit that interrupts transfer of the drive signal from the motor control unit to the drive unit, and the safety control unit controls the interrupting process of the drive signal through the interrupt unit. When a determination is made that a failure has occurred in driving of the motor, the safety control unit executes the interrupting process to realize the safety performance of the motor control device. The interrupting process executed by the safety control unit includes an interrupting process that is executed according to a result of a determination as to presence or absence of failure occurrence on the basis of a result of a comparison between the state calculation value calculated on the basis of the operation command signal and the feedback value from the encoder. The state calculation value is a parameter regarding an operating state of the motor and is a parameter value that is comparable with the feedback value from the encoder. Since this state calculation value is calculated from an input (the operation command signal) regarding operation drive of the motor, the state calculation value can be said to be a value calculated according to an observer model in control of the motor. An example of the state calculation value includes a value of a parameter regarding the same physical quantity as a physical quantity (for example, a position or speed) corresponding to the feedback value from the encoder. Further, the feedback value is a value that is calculated by the feedback signal from the encoder, and examples thereof include an information value regarding a position of the motor and an information value regarding a speed of the motor.

As described above, the interrupting process is an aspect in which not only the feedback value itself from the encoder, but also the state calculation value calculated according to a so-called observer model is adopted as input information for interrupting of the drive signal for securing the safety performance of the motor control device. Therefore, in the above motor control device, diversification of the input information for securing the safety performance of the motor control device is achieved, and thus, it is possible to enhance the safety performance of the motor control device regardless of the safety performance of the encoder. That is, by diversifying the input information, it is possible to increase a value of hardware fault tolerance (HFT), and thus, it is possible to increase a value of the SIL regarding the safety performance of the motor control device as compared with the value of an SIL regarding the safety performance of the encoder (it is understood from Table 1 above that the value of the SIL is increased when the HFT is increased in a state in which the SFF is maintained).

It should be noted that the safety control unit may make a failure determination for restriction of a speed or position of the motor using the feedback value from the encoder as another interrupting process, and perform interrupting of the drive signal according to a result of the determination.

Here, in the motor control device, the encoder may be configured to generate two independent feedback signals in response to the operation of the motor, and the safety control unit may compare each of the two predetermined feedback values calculated from the two feedback signals with the state calculation value and compare the two predetermined feedback values to execute the interrupting process of the drive signal in the interrupting process. With such a configuration, the interrupting process based on diversified input information is performed by using a result of a comparison between the duplexed feedback control signal from the encoder and the state calculation value. Accordingly, it is possible to increase a value of the SIL regarding the safety performance of the motor control device as compared with the value of the SIL regarding the safety performance of the encoder.

Here, a specific example of the interrupting process in the safety control unit in the motor control device described above is disclosed. First, the safety control unit may determine whether or not to execute the interrupting process on the basis of a difference between the predetermined feedback value and the state calculation value in the interrupting process. Further, second, the safety control unit may compare a proportional change of the predetermined feedback value with a proportional change of the state calculation value to determine whether or not to execute the interrupting process on the basis of a result of the comparison in the interrupting process. Further, third, the safety control unit may determine whether or not to execute the interrupting process on the basis of a proportional change of a difference between a proportional change of the predetermined feedback value and a proportional change of the state calculation value in the interrupting process. Further, as the interrupting process in the safety control unit, a process obtained by combining some or all of these may be adopted, or alternatively, a process other than the above-described process may be adopted.

Further, in the motor control device described above, a safety circuit board in which the safety control unit is formed may be removable from the main body side of the motor control device in which the motor control unit, the drive unit, and the interrupt unit are formed, and the safety circuit board may be removed from the motor control device, and another circuit board in which another safety control unit that executes the interrupting process of the drive signal through the interrupt unit when a determination is made that a failure has occurred in driving of the motor, which is different from the safety control unit, has been formed may be able to be incorporated in the motor control device, instead of the safety circuit board. Since the safety circuit board forming the safety control unit is configured to be removable from the main body side of the motor control device, another circuit board forming another safety control instead of the safety control unit described above can be incorporated in the motor control device, as necessary. Accordingly, it is possible to suitably provide a motor control device having the safety performance according to a demand to a user.

Advantageous Effects of Invention

It becomes possible to enhance safety performance of the motor control device regardless of safety performance of the encoder.

DESCRIPTION OF THE EMBODIMENTS

Example 1

Figure 1:
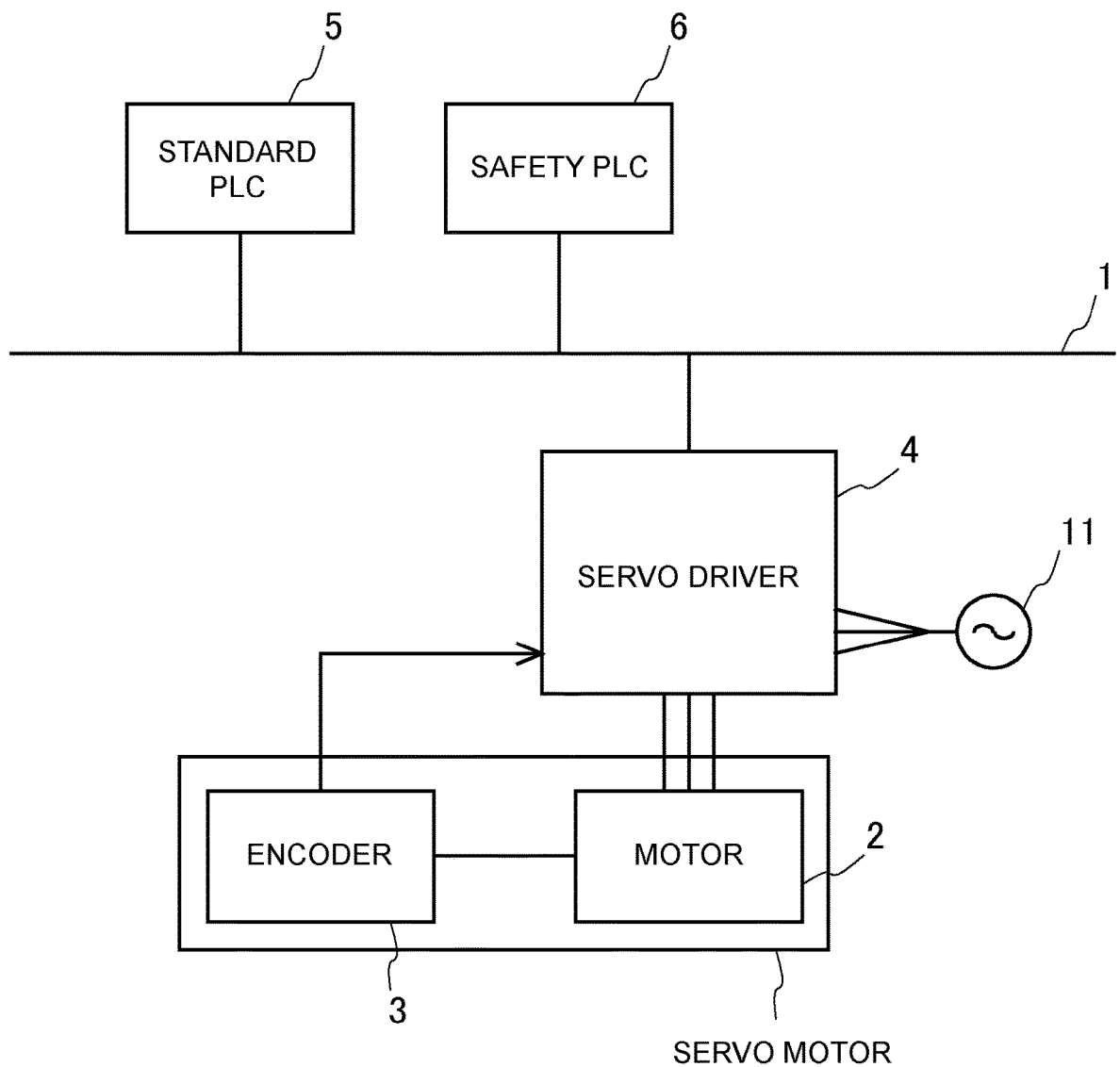
FIG. 1 is a first diagram illustrating a schematic configuration of a servo system in which a servo driver according to the present invention is incorporated.

FIG. 1 is a schematic configuration diagram of a servo system in which a servo driver corresponding to a motor control device of the present invention is incorporated. The servo system includes a network 1, a motor 2, an encoder 3, a servo driver 4, a standard programmable logic controller (PLC) 5, and a safety PLC 6. The motor 2 and the encoder 3 form a servo motor. The servo system is a system for driving the motor 2, and the motor 2 is incorporated in various mechanical devices (for example, an arm and a conveying device of an industrial robot) (not illustrated) as an actuator for the devices. For example, the motor 2 may be an AC motor. The encoder 3 is attached to the motor 2 in order to detect an operation of the motor 2. The encoder 3 generates a feedback signal indicating the detected operation of the motor 2 and transmits the feedback signal to the servo driver 4. The feedback signal includes, for example, positional information on a rotational position (angle) of a rotational shaft of the motor 2, and information on a rotational speed of the rotational shaft. A general incremental encoder or absolute encoder can be applied to the encoder 3.

The servo driver 4 receives an operation command signal regarding an operation (motion) of the motor 2 from the standard PLC 5 through the network 1, and receives the feedback signal output from the encoder 3. The servo driver 4 executes servo control on the driving of the motor 2 on the basis of the operation command signal from the standard PLC 5 and the feedback signal from the encoder 3. Further, the servo driver 4 is also connected to the safety PLC 6 via the network 1. Accordingly, the servo driver 4 performs monitoring of occurrence of a failure in the motor 2 or the servo driver 4 on the basis of the monitoring command signal received from the safety PLC 6, and sends a result of monitoring to the safety PLC 6.

Further, the servo driver 4 calculates a command value regarding the operation of the motor 2 on the basis of the operation command signal from the standard PLC 5 and the feedback signal from the encoder 3. Further, the servo driver 4 supplies a drive current to the motor 2 so that the operation of the motor 2 follows the command value. It should be noted that AC power to be sent from the AC power supply 11 to the servo driver 4 is used for the supplied current. In the example, the servo driver 4 is of a type that receives a three-phase AC current, but may be of a type that receives a single-phase AC current.

Figure 2:
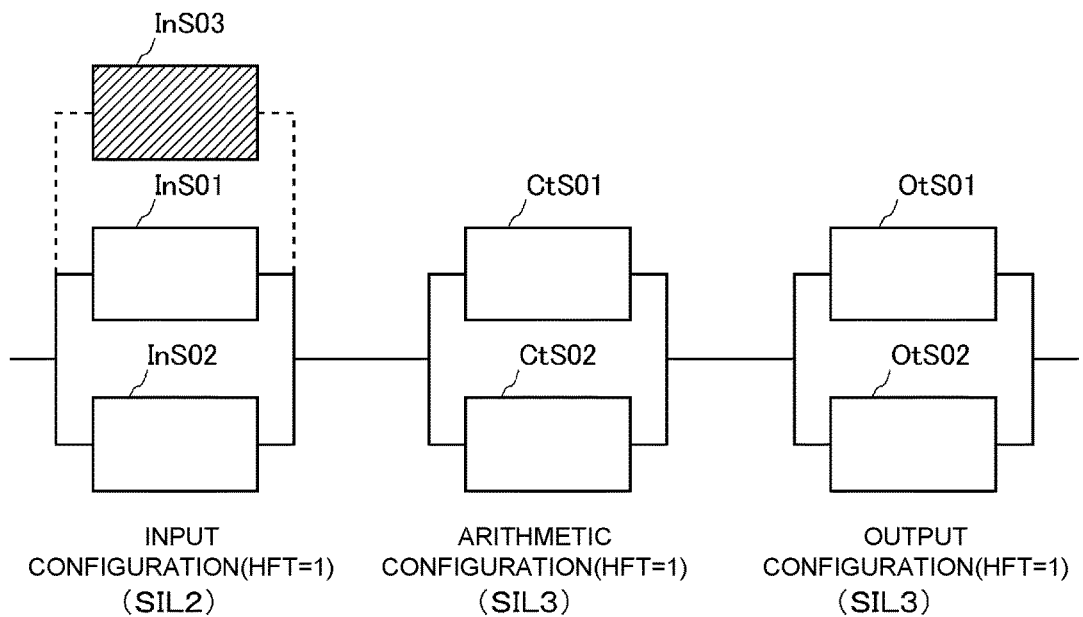
FIG. 2 is a diagram schematically illustrating safety performance in a subsystem of a servo driver according to the present invention.

Here, FIG. 2 is a block diagram of a safety function in an input configuration, an arithmetic configuration, and an output configuration that are three subsystems constituting the servo driver 4 when the servo driver 4 is one system. The input configuration is a subsystem regarding an input to the servo driver 4, and safety performance thereof greatly depends on the safety performance of the encoder 3. Specifically, the encoder 3 has a circuit duplexed to enable independent pulse output through simultaneously scanning inside the encoder 3 as will be described below, and a duplexed feedback signal is input to the servo driver 4 via an independent wiring. Therefore, the input configuration includes safety functions InS01 and InS02 due to the encoder 3, and a hardware fault tolerance (HFT) in this case is 1. Further, as an alternative to setting the HFT of the input configuration to 1, communication regarding the input configuration may be duplexed. It should be noted that, in general, it is not easy to increase a safe failure fraction (SFF) of the encoder from the viewpoint of a volume (a size) or price of the encoder, and thus, the SFF of the encoder 3 is assumed to be a relatively low range of 60% or more and less than 90%. In the input configuration, when the safety performance depends only on the encoder 3, a safety level (SIL) of the input configuration is 2.

The arithmetic configuration is a subsystem regarding arithmetic for calculating an output from an input in the servo driver 4, and has safety functions CtS01 and CtS02, for example, due to independently duplicating an arithmetic circuit using a microprocessor (MPU). In this case, the HFT is 1. Further, in general, it is easy to make the SFF of the arithmetic configuration relatively high, and thus, the SFF of the arithmetic configuration is in a relatively high range of 90% or more and less than 99%. Therefore, the SIL of the arithmetic configuration is 3. Further, the output configuration is a subsystem regarding an output from the servo driver 4 and depends on the safety performance of the interrupt unit 43 that interrupts the transfer of the drive signal from the motor control unit 42 to the drive unit 44, as will be described below. Specifically, the output configuration has safety functions OtS01 and OtS02 due to independently duplicating an electric circuit forming the interrupt unit 43. In this case, the HFT is 1. Further, in general, it is easy to make the SFF of the output configuration relatively high, and thus, the SFF in the arithmetic configuration is assumed to be a relatively high range of 90% or more and less than 99%. Therefore, the SIL of the output configuration is also 3.

Thus, in the servo driver 4, in a case in which the safety performance of the input configuration depends only on the encoder 3 and when the safety level is low (the SIL is 2), the safety performance of the entire system is also low due to an influence of the safety level and, specifically, the SIL of the servo driver 4 also becomes 2. Therefore, in the servo driver 4, a new signal is additionally adopted in addition to the feedback signal from the encoder 3 while the configuration of the encoder 3 remains the same, such that safety performance InS03 (see FIG. 2) is added to the input configuration and the HFT of the input configuration is 2. In a case in which the SFF of the input configuration belongs to a range of 60% or more and less than 90% even when the safety performance InS03 is added, the SIL of the input configuration is 3 as indicated by a white arrow in FIG. 2. As a result, considering that the SILs of the arithmetic configuration and the output configuration are 3, the SIL of the servo driver 4 can be set to 3, and the safety performance of the servo driver 4 can be enhanced. That is, it is possible to enhance the safety performance of the servo driver 4 regardless of the safety performance of the encoder 3 itself and, in other words, it is possible to enhance the safety performance of the servo driver 4 inexpensively while maintaining the safety performance of the encoder 3 itself.

Figure 3:
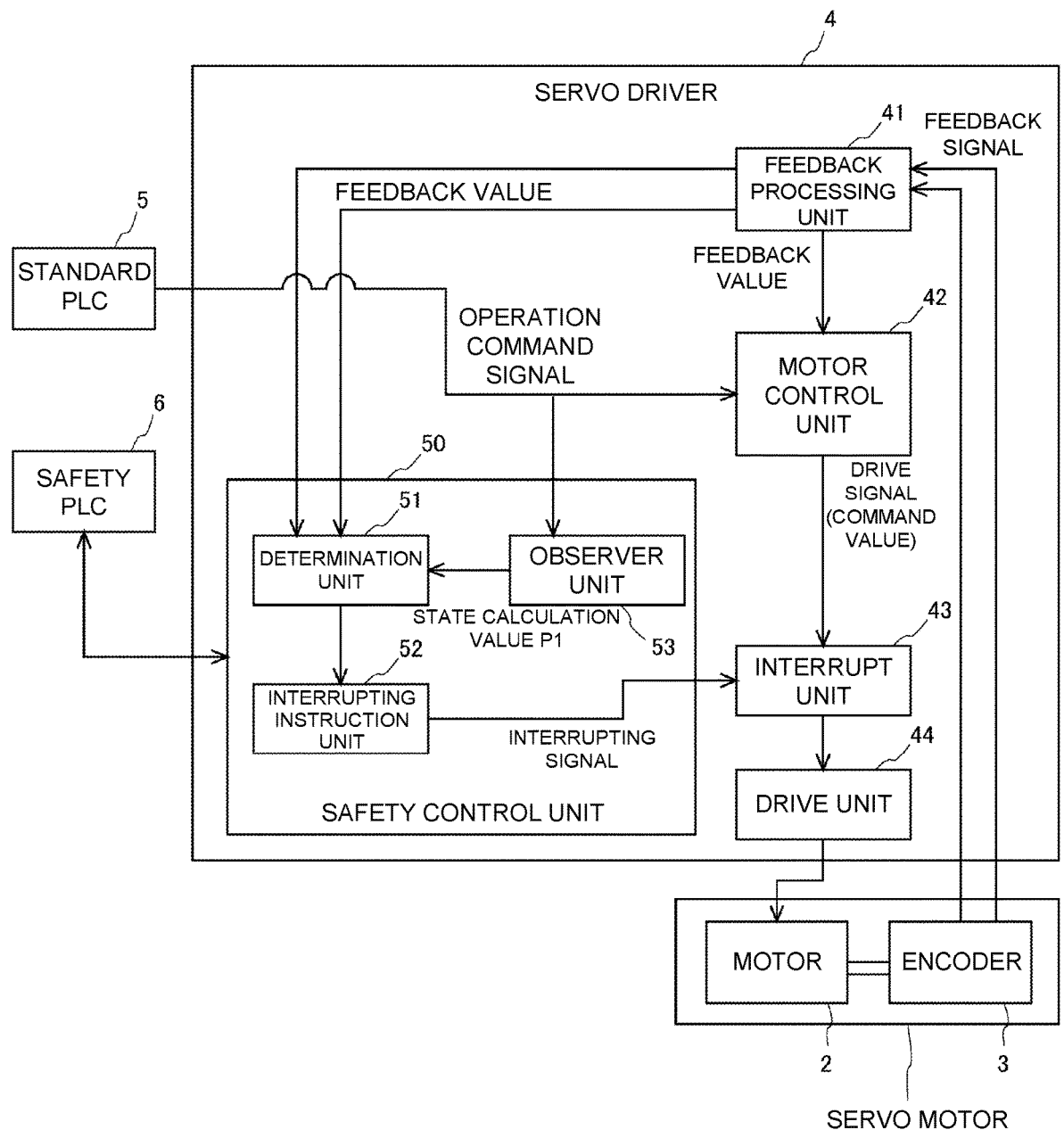
FIG. 3 is a first functional block diagram of the servo driver according to the present invention.

Hereinafter, a more specific configuration of the servo driver 4 will be described. FIG. 3 is a functional block diagram of the servo driver 4. As illustrated in FIG. 3, the servo driver 4 includes a feedback processing unit 41, a motor control unit 42, an interrupt unit 43, a drive unit 44, and a safety control unit 50. It should be noted that, although the following description will be focused on the input configuration of the servo driver, it is assumed that the respective HFTs are 1 as illustrated in FIG. 2 for the arithmetic configuration and the output configuration. First, the feedback processing unit 41 generates a feedback value on the basis of the feedback signal from the encoder 3. For example, when a pulse is output from the encoder 3, the feedback processing unit 41 counts this pulse to calculate a rotational position or a rotational speed of a rotation shaft of the motor 2, and generates a feedback value including a value indicating the position or the speed.

It should be noted that the encoder 3 has a circuit duplexed to enable independent pulse output by simultaneously performing scanning in the encoder 3, and outputs a duplexed feedback signal. Therefore, the feedback processing unit 41 receives the duplexed feedback signal from the encoder 3 and generates a duplexed feedback value on the basis of the feedback signal. The feedback processing unit 41 sends the generated duplexed feedback value to the motor control unit 42 and also to the safety control unit 50.

Next, the motor control unit 42 receives the operation command signal from the standard PLC 5 and receives the feedback value from the feedback processing unit 41. The motor control unit 42 generates a command value for executing position feedback control and speed feedback control on the basis of the operation command signal and the feedback value. It should be noted that a feedback scheme to be adopted in the feedback control is a scheme in which a servo loop suitable for a predetermined purpose (for example, conveyance of packages) of a mechanical device (for example, a conveyance device) in which the motor 2 is incorporated is formed, and can be appropriately designed. These command values generated by the motor control unit 42 are sent as drive signals to the interrupt unit 43.

Next, when the interrupt unit 43 receives an interrupting signal from the safety control unit 50 to be described below, the interrupt unit 43 stops the drive unit 44 not by electrically passing the drive signal from the motor control unit 42 to the drive unit 44 to be described below. Accordingly, even when the motor control unit 42 transmits the drive signal, the output of the torque in the motor 2 is stopped. On the other hand, when the interrupting signal is not input to the interrupt unit 43, the interrupt unit 43 passes the drive signal with a command value output from the motor control unit 42 to the drive unit 44 as it is.

Here, the drive unit 44 receives the drive signal from the motor control unit 42 via the interrupt unit 43. The drive unit 44 includes, for example, a circuit including a semiconductor switching element such as an insulated gate bipolar transistor (IGBT), and generates a signal for turning on or off the switching element according to a PWM scheme on the basis of the drive signal from the motor control unit 42, and turns on or off the switching element according to this signal. Accordingly, AC power is supplied to the motor 2 and the motor 2 is driven according to the drive signal. On the other hand, when the interrupt unit 43 operates and the transfer of the drive signal to the drive unit 44 is interrupted, the output from the drive unit 44 is fixed to OFF. Accordingly, since the power supply to the motor 2 is stopped, the output of the torque from the motor 2 is stopped.

Thus, the feedback processing unit 41, the motor control unit 42, the interrupt unit 43, and the drive unit 44 are so-called functional units directly related to the drive control of the motor 2. On the other hand, the safety control unit 50 is a functional unit that determines occurrence of a failure in the servo driver 4 regarding an operation of the motor 2, and stops the operation of the motor 2 to ensure safety for the operation when a determination is made that the failure has occurred. Specifically, the safety control unit 50 includes a determination unit 51, an interrupting instruction unit 52, and an observer unit 53. Control regarding safety ensuring including a failure determination in the safety control unit 50 is executed on the basis of a monitoring command from the safety PLC 6.

The determination unit 51 is a functional unit that determines whether or not a failure related to the operation of the motor 2 has occurred. The determination unit 51 receives the duplexed feedback value from the feedback processing unit 41, receives the state calculation value P1 from the observer unit 53, and performs a determination as to occurrence of a failure on the basis of the values of these parameters.

Figure 4:
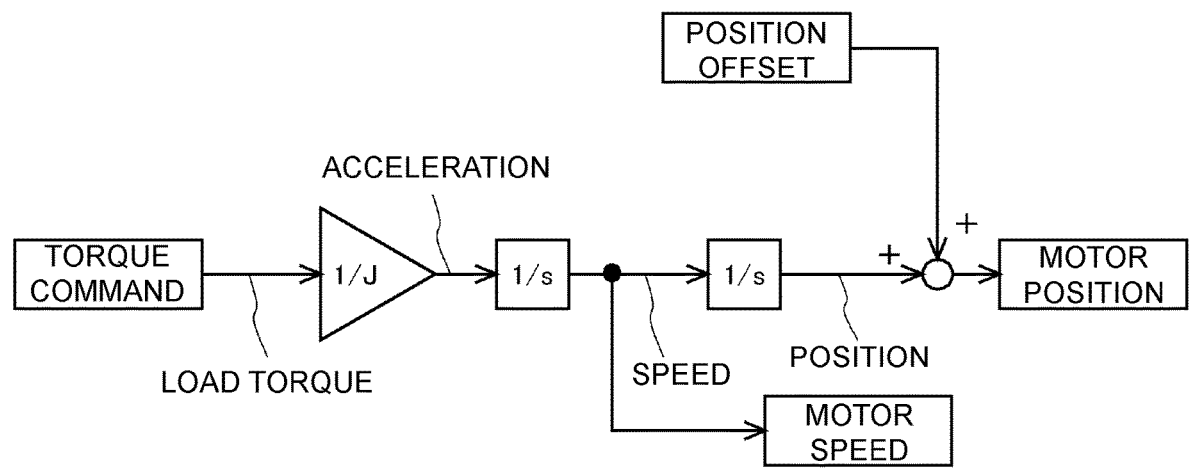
FIG. 4 is a diagram illustrating a model for calculating a state calculation value in an observer unit.

An aspect in which the observer unit 53 calculates the state calculation value P1 on the basis of the calculation model illustrated in FIG. 4 will be described herein. The observer unit 53 receives an operation command signal from the standard PLC 5. The observer unit 53 calculates the state calculation value P1 on the basis of the value of the parameter based on the operation command signal. Specifically, the observer unit 53 calculates an acceleration of the motor 2 by dividing a load torque based on a torque command included in the operation command signal by a total inertia J of the motor 2 and a load. Thereafter, the calculated acceleration is integrated to calculate a motor speed that is one state calculation value P1. Further, the motor speed is integrated and a position offset amount (information on a motor position at an initial stage of calculation) is added to calculate the motor position that is one state calculation value P1.

Thus, the state calculation value P1 is a parameter value that is comparable with the feedback value. For example, when the feedback value to be sent from the feedback processing unit 41 to the determination unit 51 is a value regarding the speed of the motor 2, the state calculation value P1 is a value of a parameter regarding the motor speed calculated by the observer unit 53. Further, when the feedback value is a value regarding the position of the motor 2, the state calculation value P1 is a value of a parameter regarding the motor position calculated by the observer unit 53 similarly. It should be noted that, when the feedback value is a value regarding the speed and position of the motor 2, the state calculation value P1 is both of the value of the parameter regarding the motor speed and the value of the parameter regarding the motor position.

The determination unit 51 compares the state calculation value P1 with the two feedback values. Specifically, the determination unit 51 additionally receives the state calculation value P1 as a new feedback value, in addition to the two feedback values from encoder 3. Therefore, the determination unit 51 receives three signals having the same quality as the feedback value. In order to confirm the validity of all the signals, the determination unit 51 determines whether or not a difference between two of the three signals is in an allowable range with respect to all combinations of the two signals. When the difference in any combination deviates from an allowable range, this means that the feedback signal that is an input from the encoder 3 to the servo driver 4 and an operation state of the servo motor to be estimated deviate from each other and, therefore, a reasonable determination can be made that a failure has occurred. That is, the determination unit 51 can compare the state calculation value P1 with the two feedback values to determine the validity of the signal corresponding to each value. Further, as an alternative to a rational failure determination, a proportional change of the state calculation value P1 may be compared with a proportional change of the feedback value to determine whether or not a difference between the two proportional changes is in the allowable range. Further, a determination may be made as to whether or not a proportional change of the difference between the two proportional changes is in an allowable range or any combination of these failure determination aspects may be adopted.

Thus, the determination unit 51 determines the validity of each signal using three signals obtained by adding the state calculation value P1 to the two feedback values. When the determination unit 51 determines that at least one of the signals is not valid, an interrupting signal is generated by the interrupting instruction unit 52 and the generated interrupting signal is sent to the interrupt unit 43. The interrupt unit 43 that has received the interrupting signal interrupts the transfer of the drive signal from the motor control unit 42 to the drive unit 44 as described above, thereby stopping a torque output from the motor 2. It should be noted that the safety PLC 6 is notified of such a control state (presence or absence of a failure) in the safety control unit 50 in the form of an answer to the monitoring command from the safety PLC 6.

Figure 5:
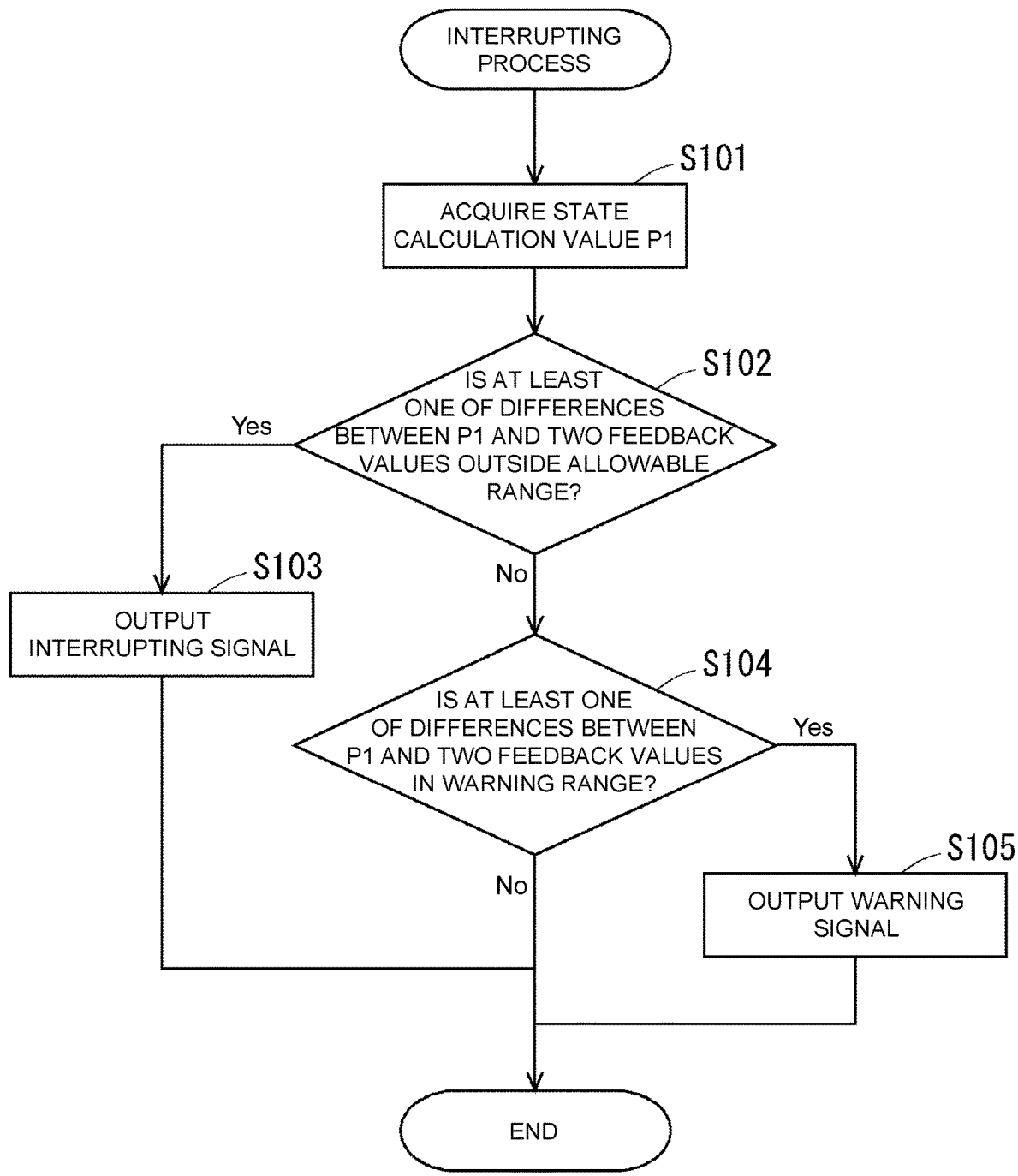
FIG. 5 is a flowchart of an interrupting process that is executed by the servo driver according to the present invention.

An interrupting process of the safety control unit 50 including the determination unit 51, the interrupting instruction unit 52, and the observer unit 53 will be described on the basis of FIG. 5. The interrupting process illustrated in FIG. 5 is repeatedly executed, for example, using a control cycle time (for example, 2 msec) in which the command value is generated by an arithmetic device (an MPU or the like), which forms the safety control unit 50. In S101, the determination unit 51 acquires the state calculation value P1 calculated by the observer unit 53. Then, in step S102, the determination unit 51 compares the state calculation value P1 with the two feedback values and determines whether a difference between these is outside an allowable range. That is, a determination is made as to whether or not each of a difference between the state calculation value P1 and one feedback value, a difference between the state calculation value P1 and the other feedback value, and a difference between the two feedback values is outside the allowable range. When at least one of the differences is outside the allowable range, a positive determination is made in S102.

When the determination in step S102 is positive and the process proceeds to step S103, an interrupting signal is generated by the interrupting instruction unit 52 and the generated interrupting signal is sent to the interrupt unit 43 in step S103. Accordingly, the torque output from the motor 2 is stopped. Further, when a negative determination is made in S102, the process proceeds to S104. In step S104, the state calculation value P1 is compared with each of the two feedback values, and a determination is made as to whether or not a difference between the state calculation value P1 and the feedback values is in a warning range. This warning range is a range that is in an allowable range and is near a boundary of the allowable range. Therefore, a state in which the difference belongs to the warning range can be said to be a state in which the difference belongs to the allowable range, but is about to deviate from the allowable range. That is, when the difference is in the warning range, this can be reasonably regarded as a sign of a failure of the feedback signal, which is the input signal from the encoder 3. Therefore, when a positive determination is made in step S104, the process proceeds to step S105, and a warning signal is output from the safety control unit 50 to the safety PLC 6. Further, when a negative determination is made in S104, the generation of the interrupting signal in the interrupting instruction unit 52 is not performed, and the interrupting process ends.

Thus, in the servo driver 4, the two feedback values from the encoder 3 are added, the state calculation value P1 is compared with the two feedback values by the determination unit 51, the determination as to the validity of each signal is performed, and the torque output from the motor 2 is stopped by the operation of the interrupt unit 43 when a determination is made that the signal is not valid. That is, in the servo driver 4, it is possible to increase the HFT regarding the input configuration of the servo driver 4 from 1 to 2 by increasing the number of substantial signals that are targets of the determination as to the validity of the input signal in the input configuration. When the SFF of the input configuration is in the range of 60% or more and less than 90% after the failure determination is performed, the SIL of the input configuration also is increased from 2 to 3 with the increase in the HFT (See FIG. 2).

Further, the determination unit 51 can also perform a failure determination other than the failure determination as to the feedback signal, which is the input signal from the encoder 3 described above. For example, each of the two feedback values received from the feedback processing unit 41 is compared with an upper limit value set and stored in the safety control unit 50 in advance. When the feedback value exceeds the upper limit value, this means that an actual operation state of the servo motor deviates from an original operation state of the servo motor, and therefore, a reasonable determination can be made that any failure has occurred. It should be noted that the upper limit value is a value corresponding to, for example, speed limit (SLS) or position limit (SLP) that is a known failure determination.

Example 2

Figure 6:
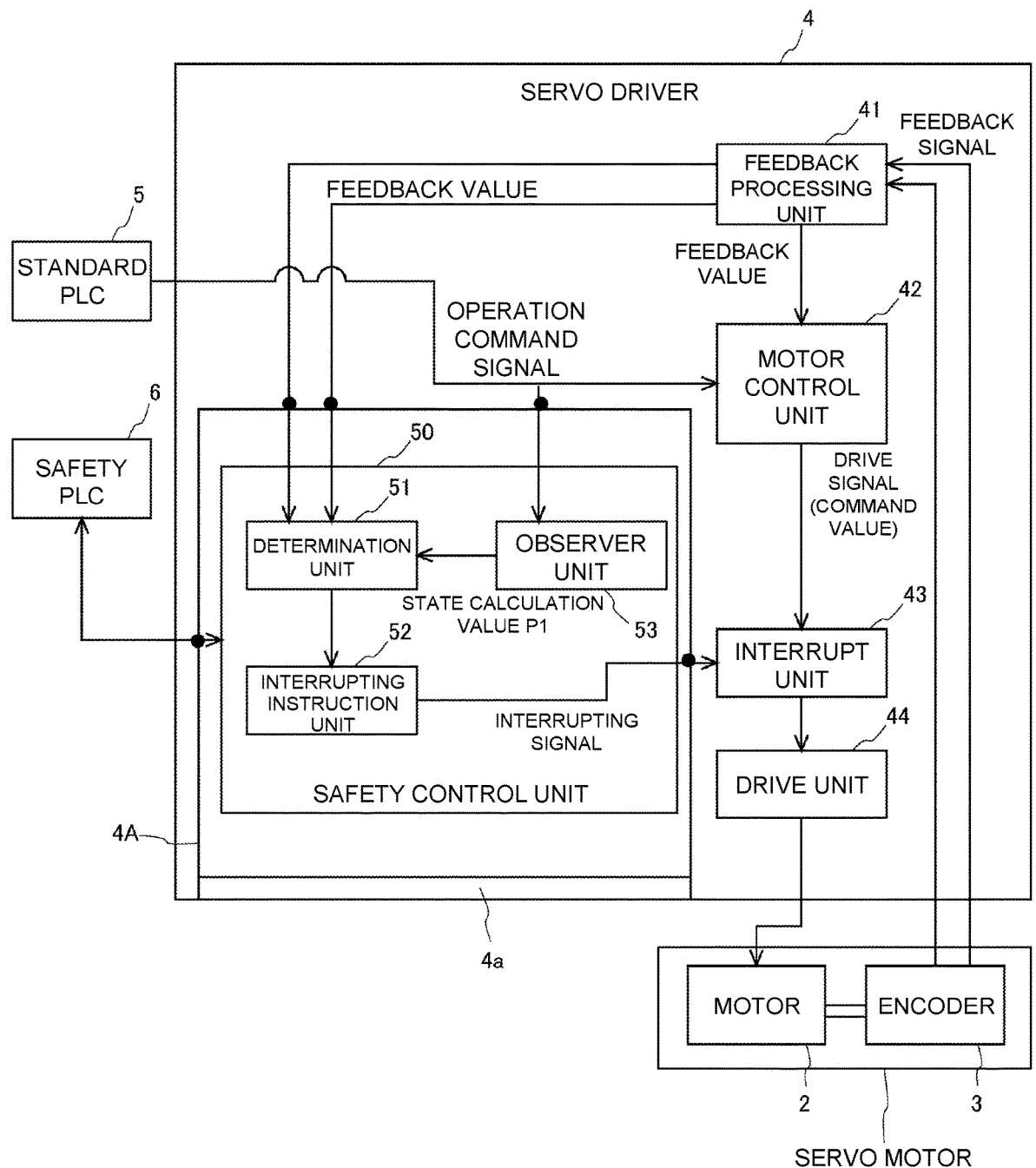
FIG. 6 is a second functional block diagram of the servo driver according to the present invention.

A functional configuration of the servo driver 4 of the present invention will be described on the basis of FIG. 6. Among functional units illustrated in FIG. 6, functional units substantially the same as the functional units illustrated in FIG. 3 are denoted by the same reference numerals and detailed description thereof will be omitted.

In the embodiment, a feedback processing unit 41, a motor control unit 42, an interrupt unit 43, and a drive unit 44, which are functional units directly related to drive control of the motor 2, are disposed on the main body side of the servo driver 4. In this disposition, since the drive unit 44 is disposed under a higher voltage environment than the other functional units, a known appropriate insulation process is performed between the drive unit 44 and the other functional units. On the other hand, the safety control unit 50 is formed on the safety circuit board 4A.

The circuit board 4A is configured to be removable from the main body via a slot 4a provided on the main body side of the servo driver 4. Therefore, when the circuit board 4A is incorporated in a main body of the servo driver 4 through the slot 4a, electrical contacts between the circuit board 4A and the main body of the servo driver 4 are designed so that exchange of signals between the safety PLC 6 and the safety control unit 50 is possible, so that the determination unit 51 receives the feedback value from the feedback processing unit 41, so that the observer unit 53 receives the operation command signal from the standard PLC 5, and so that the interrupt unit 43 receives the interrupting signal from the interrupting instruction unit 52.

Further, in the servo driver 4, another circuit board in which another safety control unit that executes the interrupting process of the drive signal through the interrupt unit 43 when a determination is made that a failure has occurred in the driving of the motor 2, which is different from the safety control unit 50, has been formed may be incorporated in the servo driver 4 in a state in which the circuit board 4A has been removed. For example, another circuit board in which a safety control unit capable of executing only a failure determination regarding speed limit (SLS), position limit (SLP), or the like has been formed may be incorporated in the main body of the servo driver 4 without making a failure determination as to the feedback signal, which is an input signal from the encoder 3 described above. With this configuration, it is possible to easily provide a user who does not need that the SIL of the servo driver is 3 with a servo driver having necessary safety performance by using a common functional unit directly related to the drive control of the motor 2.

Modification Example 1

Although the aspect in which the SIL of the input configuration as the subsystem is 2 and the SIL of the arithmetic configuration and the output configuration is 3 has been illustrated in the embodiment described above, the present invention can naturally be applied to other aspects. For example, in an aspect in which the feedback signal is not duplexed, the SIL of the input configuration using an encoder with relatively low safety performance is 1, and the SIL of the arithmetic configuration and the output configuration is 2, it is possible to set the SIL of the servo driver according to the aspect to 2 regardless of the safety performance of the encoder by applying a failure determination of the feedback signal, which is the input signal from the encoder 3 and a process regarding interrupting.

Modification Example 2

Figure 7:
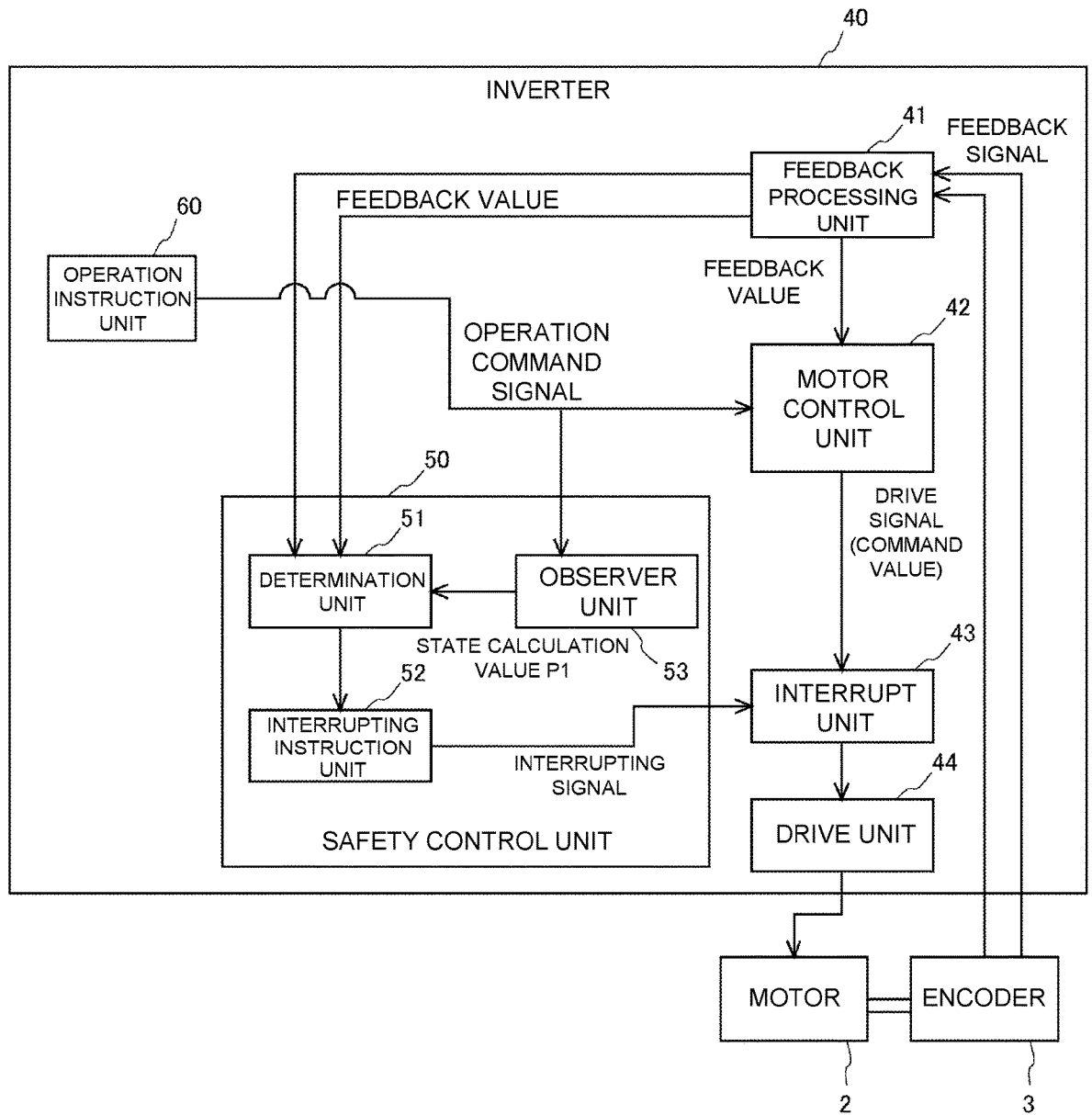
FIG. 7 is a functional block diagram of an inverter according to the present invention.

Although the servo driver 4 as a motor control device of the present invention is illustrated in the above example, the inverter 40 illustrated in FIG. 7 can also be adopted as the motor control device in place of the aspect. It should be noted that an induction motor or the like can be illustrated as the motor 2 driven and controlled by the inverter 40. FIG. 7 is a diagram illustrating functional blocks of the inverter 40. As illustrated in FIG. 7, the inverter 40 includes a plurality of functional units. Among the functional units, the functional units substantially the same as the functional units included in the servo driver 4 illustrated in FIG. 3 are denoted with the same reference numerals, and detailed description thereof will be omitted. Specifically, the inverter 40 also includes a feedback processing unit 41, a motor control unit 42, an interrupt unit 43, a drive unit 44, and a safety control unit 50, and also includes an operation instruction unit 60.

The operation instruction unit 60 generates the operation command signal for driving the motor 2 on the basis of a request operation given by the user via an input device (not illustrated) in advance. Therefore, no operation command signal is provided from an external device (for example, the standard PLC 5) to the inverter 40, and the inverter 40 drives and controls the motor 2 according to a predetermined feedback scheme on the basis of the feedback signal from the encoder 3 and the operation command signal from the operation instruction unit 60. Alternatively, the operation command signal may be provided from the external device to the inverter 40. In the inverter 40 configured in this way, the two feedback values from the encoder 3 are added, the state calculation value P1 is compared with the two feedback values by the determination unit 51 included in the safety control unit 50, the determination as to the validity of each signal is performed, and the torque output from the motor 2 is stopped by the operation of the interrupt unit 43 when a determination is made that the signal is not valid, as in the servo driver 4 described above. As a result, in the inverter 40, it is possible to achieve improvement of the SIL of the input configuration by increasing the number of substantial signals that are targets of the validity determination as to the input signal in the input configuration.

What is claimed is:

1. A motor control device for driving a motor having an encoder that detects an operation of the motor, the motor control device comprising a hardware servo driver configured as:
   a motor control unit that generates a command value regarding the operation of the motor according to a predetermined feedback scheme so that the operation of the motor follows an operation command signal for driving the motor on the basis of the operation command signal and a feedback signal from the encoder corresponding to the operation of the motor;
   a drive unit that supplies a drive current for driving the motor to the motor according to the command value from the motor control unit;
   an interrupt unit that interrupts transfer of a drive signal from the motor control unit to the drive unit according to the command value; and
   a safety control unit that executes an interrupting process of the drive signal via the interrupt unit when a determination is made that a failure has occurred in driving of the motor,
   wherein the safety control unit executes the interrupting process of the drive signal in the interrupt unit on the basis of a result of comparing a predetermined feedback value that is calculated according to the feedback signal from the encoder with a state calculation value regarding an operation state of the motor that is calculated according to a calculation model on the basis of the operation command signal and is comparable with the predetermined feedback value, wherein the encoder is configured to generate two independent feedback signals in response to the operation of the motor, and the safety control unit compares each of the two predetermined feedback values calculated from the two feedback signals with the state calculation value and compares the two predetermined feedback values to execute the interrupting process of the drive signal in the interrupting process.

2. The motor control device according to claim 1, wherein the safety control unit determines whether or not to execute the interrupting process on the basis of a difference between the predetermined feedback value and the state calculation value in the interrupting process.

3. The motor control device according to claim 2, wherein a safety circuit board in which the safety control unit is formed is removable from the main body side of the motor control device in which the motor control unit, the drive unit, and the interrupt unit are formed, and the safety circuit board is removed from the motor control device, and another circuit board in which another safety control unit that executes the interrupting process of the drive signal through the interrupt unit when a determination is made that a failure has occurred in driving of the motor, which is different from the safety control unit, has been formed is able to be incorporated in the motor control device, instead of the safety circuit board.

4. The motor control device according to claim 1, wherein the safety control unit compares a proportional change of the predetermined feedback value with a proportional change of the state calculation value to determine whether or not to execute the interrupting process on the basis of a result of the comparison in the interrupting process.

5. The motor control device according to claim 4, wherein a safety circuit board in which the safety control unit is formed is removable from the main body side of the motor control device in which the motor control unit, the drive unit, and the interrupt unit are formed, and the safety circuit board is removed from the motor control device, and another circuit board in which another safety control unit that executes the interrupting process of the drive signal through the interrupt unit when a determination is made that a failure has occurred in driving of the motor, which is different from the safety control unit, has been formed is able to be incorporated in the motor control device, instead of the safety circuit board.

6. The motor control device according to claim 1, wherein the safety control unit determines whether or not to execute the interrupting process on the basis of a proportional change of a difference between a proportional change of the predetermined feedback value and a proportional change of the state calculation value in the interrupting process.

7. The motor control device according to claim 6, wherein a safety circuit board in which the safety control unit is formed is removable from the main body side of the motor control device in which the motor control unit, the drive unit, and the interrupt unit are formed, and the safety circuit board is removed from the motor control device, and another circuit board in which another safety control unit that executes the interrupting process of the drive signal through the interrupt unit when a determination is made that a failure has occurred in driving of the motor, which is different from the safety control unit, has been formed is able to be incorporated in the motor control device, instead of the safety circuit board.

8. The motor control device according to claim 1, wherein a safety circuit board in which the safety control unit is formed is removable from the main body side of the motor control device in which the motor control unit, the drive unit, and the interrupt unit are formed, and the safety circuit board is removed from the motor control device, and another circuit board in which another safety control unit that executes the interrupting process of the drive signal through the interrupt unit when a determination is made that a failure has occurred in driving of the motor, which is different from the safety control unit, has been formed is able to be incorporated in the motor control device, instead of the safety circuit board.

* * * * *